United States Patent [19]

Sampson et al.

[11] Patent Number: 5,002,015

[45] Date of Patent: Mar. 26, 1991

[54] SUBMERGED TREADMILL SYSTEM FOR EXERCISING ANIMALS

[75] Inventors: Harold D. Sampson; Roy Rosebrook, both of Cypress, Calif.

[73] Assignee: Aerotrace Hydraulics, Inc., Los Alamitos, Calif.

[21] Appl. No.: 282,075

[22] Filed: Dec. 9, 1988

[51] Int. Cl.$^5$ .................. A01K 15/00; A63B 22/02; B65G 15/60

[52] U.S. Cl. ........................ 119/29; 272/69; 198/811

[58] Field of Search .................. 119/29; 198/811, 810; 272/69

[56] References Cited

U.S. PATENT DOCUMENTS

| | | | |
|---|---|---|---|
| 478,502 | 7/1892 | Corning | 198/811 X |
| 756,600 | 4/1904 | Dodge | 198/811 |
| 3,592,334 | 7/1971 | Fleischaver | 198/811 X |
| 3,603,647 | 9/1971 | Geneva et al. | 198/811 |
| 3,606,320 | 9/1971 | Erwin, Jr. | 272/69 |
| 3,688,894 | 9/1972 | Joug et al. | 198/811 |
| 3,689,066 | 9/1972 | Hagen | 272/69 |
| 3,889,801 | 6/1975 | Boyer | 198/811 X |
| 4,197,815 | 4/1980 | Brazelton | 119/29 |
| 4,322,217 | 6/1982 | Davis | 119/29 |
| 4,379,438 | 4/1983 | Peardon | 119/29 |
| 4,645,069 | 2/1987 | Sjogren | 198/810 X |
| 4,674,626 | 6/1987 | Adcock | 198/811 |

FOREIGN PATENT DOCUMENTS 2127267 4/1984 United Kingdom .................. 119/29

Primary Examiner—John J. Wilson
Assistant Examiner—R. Thomas Price
Attorney, Agent, or Firm—Donald D. Mon

[57] ABSTRACT

An animal exerciser having a water pool in which there is a submerged treadmill. The treadmill includes an endless belt with a top run on which the animal rests. A rigid support plate supports the top run. The support plate is perforated, and air is blown through its perforations to lubricate and separate in the region between the support plate and the top run. The discharged air tends to attach itself to particulate matter in the pool, which is readily removed for screening from the pool.

1 Claim, 2 Drawing Sheets

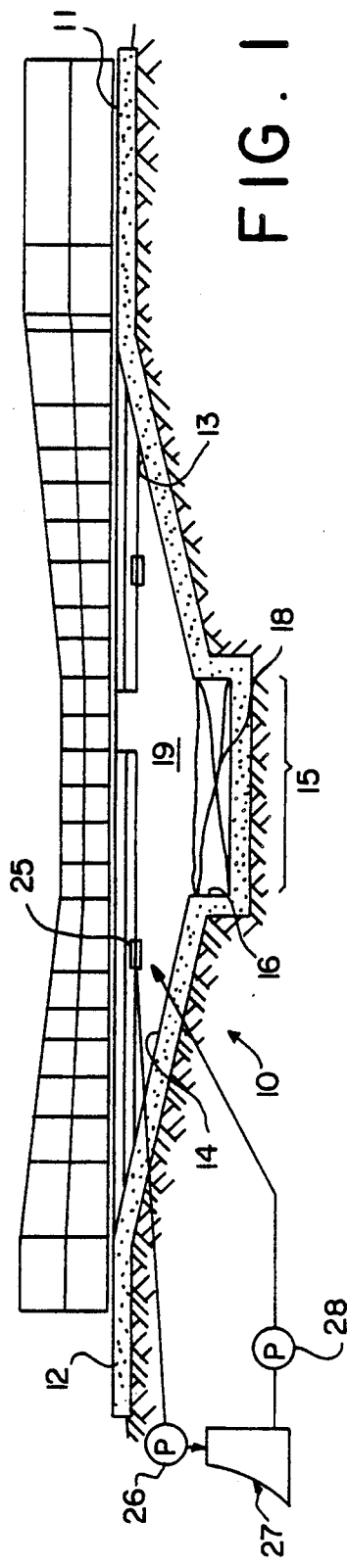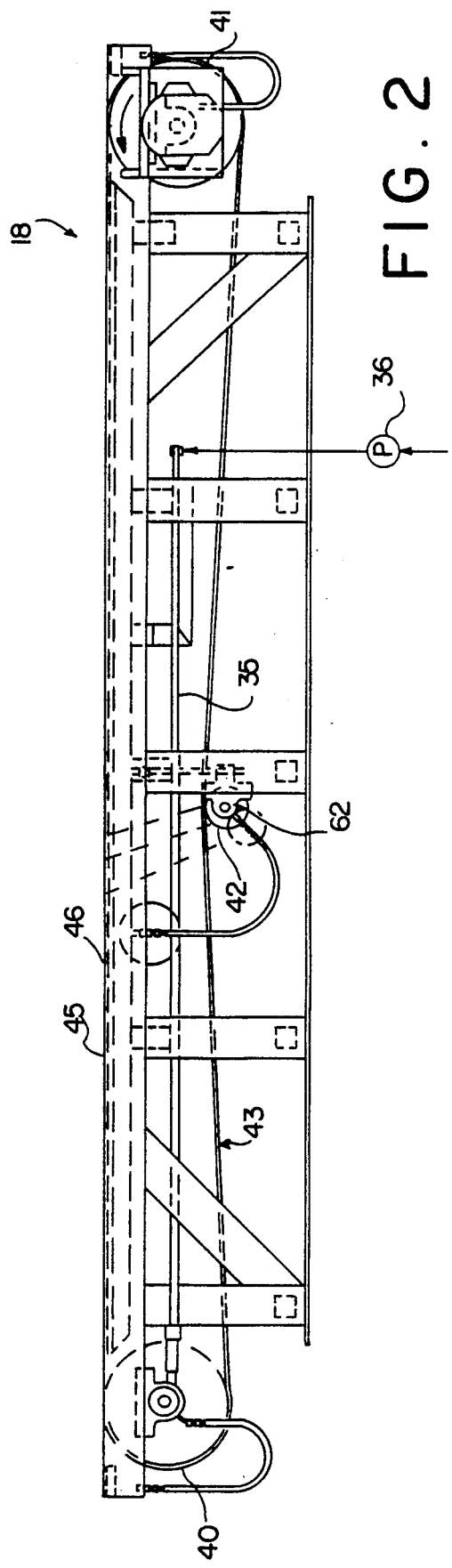

SUBMERGED TREADMILL SYSTEM FOR EXERCISING ANIMALS

FIELD OF THE INVENTION

This invention relates to a submerged treadmill system for exercising animals, especially horses.

BACKGROUND OF THE INVENTION

The benefits of exercising animals such as race horses in the water are well-known. When the exercise is given at an appropriate water depth, at least some of the horse's weight is taken off of the animal's legs, and the workout can provide the necessary exercise, but without as much effect on a lame leg, for example. Also, the race horse may be so saddle sore that it cannot be ridden. Then an appropriate workout can still be given to the horse, but without a rider.

Submerged treadmills for this purpose are shown in Scanlon U.S. Pat. No. 3,485,213 and Davis U.S. Pat. No. 4,332,217. The problems of limb support and of belt friction are discussed in Davis U.S. Pat. No. 4,227,487.

In the instant invention, the treadmill is disposed in a trench, and ramps lead from grade down to the treadmill so the animal can walk through the system without draining the pool. While on the treadmill the animal is restrained so as to remain in place, and must run or walk to keep up with the powered treadmill. The water remains in the pool, and is recirculated through pumping and filtration means.

Such a system has two problems. One relates to treadmill belt wear and down time, and the other to general sanitation and cleanliness of the system.

As to belt wear, the horse steps heavily on the belt, and the belt drags along a supporting plate. This type of wear destroys the belt in a rather short length of time. Treatment of horses with this system is quite profitable, and down time for repairs must be minimized.

As to sanitation, horses have no concept of it, and a pool in which horses exercise is soon contaminated with particulate fecal material. Unless something is done about this, horses will leave the tank covered with material, the tank will become foul, and during operation the mechanism can tend to gum up.

A technique which has been used to minimize this pollution is continuously to recycle the water through conventional filters such as are used in swimming pools or in water clarification plants. However, these very soon plug up due to the large amount of material deposited by the animals. Furthermore, even though during exercise the animal stirs the pool rather vigorously, it is practically impossible to get all the material through the filter in a sensibly short period of time. As a result, the conventional pool is too often an unsightly scene. Fastidious horse owners dislike it.

This invention attends to these problems, providing a cleaner and more quickly cleaned pool, and greatly extending the life of the treadmill belt.

BRIEF DESCRIPTION OF THE INVENTION

This invention is carried out in a pool that overlays an endless belt. The belt has a top run of sufficient length to accommodate the animal, together with driver rollers and tensioning rollers as appropriate. A support plate underlays the top run so as to give support to the animal in addition to that which is inherently provided by the tensioned belt. The support plate is perforated, and air is passed through the perforations to provide a separative lift of the top run from the support plate, except where the horse's foot momentarily bears, and even there it reduces the effect. This greatly increases the life of the belt.

In addition, the pool is provided with skimmer ports at the water level from which water is withdrawn to be filtered. The general theory is that sooner or later all particulate material will flow into these ports and be filtered out. The problem is that the material is not especially buoyant, and without assistance the filtration process is slow and inefficient in removing it. According to a feature of this invention, the air injected under the support plate, and perhaps other air in addition, tends to attach to the particles and increase their buoyancy and with it the likelihood that they will reach the skimmer ports. Also it tends to flush the material away from the workings of the treadmill whereby to keep it cleaner.

According to a preferred but optional feature of this invention, the filtration system includes a static screen side-hill filter which has improved properties for the removal of material of this type.

The above and other features of this invention will be fully understood from the following detailed description and the accompanying drawings, in which:

BRIEF DESCRIPTION OF THE DRAWINGS

FIG. 1 is an axial section of a system according to the invention;

FIG. 2 is a detailed view of a portion of FIG. 1; and

DETAILED DESCRIPTION OF THE INVENTION

Figure 3:
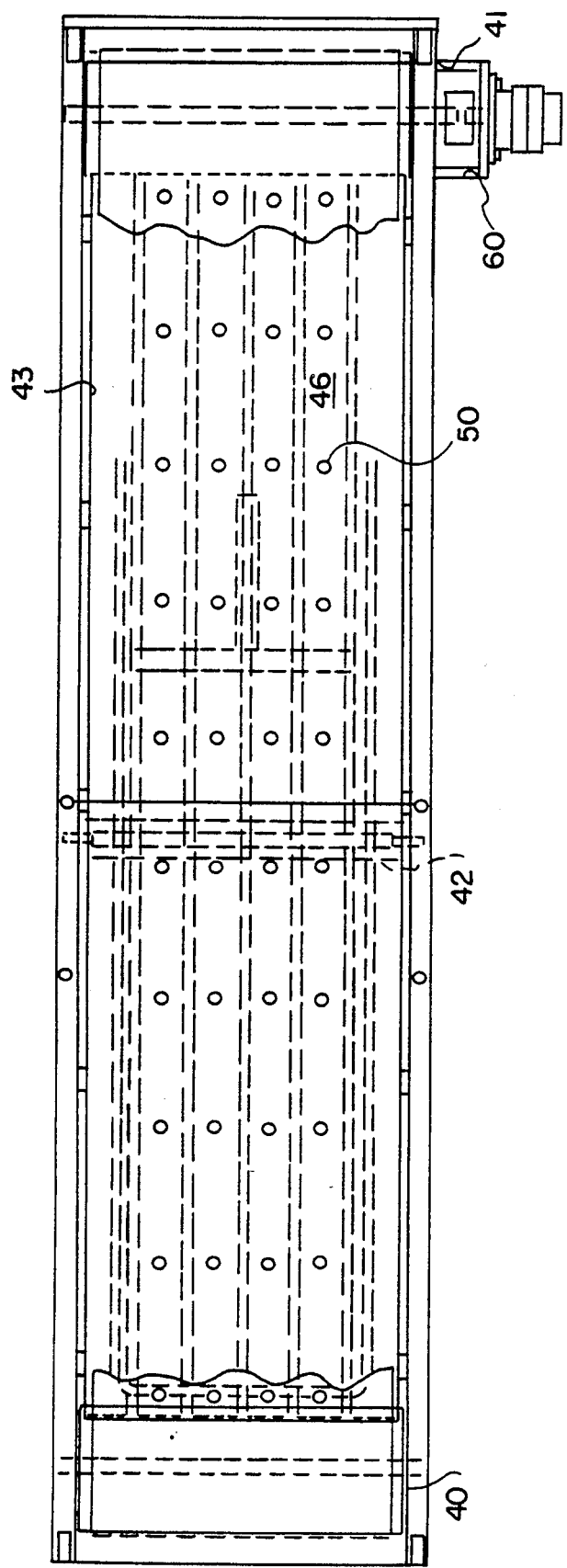
FIG. 3 is a plan view of the portion shown in FIG. 2.

A treadmill system 10 according to the invention is shown in FIG. 1. Entry and exit pathways 11, 12 are shown at grade level, leading to and away from entry and exit ramps 13, 14, which lead to a central portion 15.

The central portion includes a pit 16 which receives a treadmill 18 that is shown in detail in FIG. 2. A water pool 19 is thereby provided below grade into which and from which the animal walks. A removable butt gate and a forward tether (not shown) are provided to be certain the animal remains on the treadmill.

Skimmer ports 25 are formed in the wall of the structure at and just below the intended upper water level. A pump 26 boosts the water which enters these ports to filtration means 27. A scavenger pump 28 returns filtered water to the pool.

Any suitable filtration device can be used, but a static side-hill screen of the type shown in Godbeer U.S. Pat. No. 4,671,877 is particularly effective. It operates without using energy, and has no need to change filter packagings. A clarity sensibly near that of sand filters can be attained. The Godbeer patent is incorporated herein in its entirety for its showing of a useful side-hill screen.

The pool is also provided with nozzles 30 for air or water to be used in the jacuzzi mode if desired.

One or more air headers 35 are disposed near the bottom of the pit. These receive compressed air from a pump 36, and discharge it in a region yet to be described.

Treadmill 18 has a pair of driver rollers 40, 41 and a tensioning roller 42. An endless belt 43 is wrapped around these rollers, and includes a top run 45 on which the animal rests. The belt is a heavy flexible body that itself can support the animal. However, it is better practice to include a support plate 46 beneath it upon which the top run rests. When wetted by the water, friction is reduced between the plate and the belt, but the wear is still substantial. To avoid this, the support plate has a substantial number of perforations 50 through it, and the plate overlays the air header or headers. Then air discharged through the header passes through the perforations, where it forms an air pad that lifts the top run off the plate over a substantial area. This has proved to greatly lengthen the service life of the belt.

After it passes the belt, the air bubbles into the pool. Its bubbles tend to attach themselves to the particulate fecal material and assists in raising it to the surface where it efficiently flows to the skimmer ports. Thus it not only lubricates and cleans the submerged interfaces, and reduces belt wear, but assists importantly moving this particulate material to the skimmer ports.

Drive motor 60 drives the belt. Tensioning motor 62 moves the tensioning roller to maintain a proper belt tension.

The drive motors are preferably hydraulically powered, and under the control of an adjustable off-on valve such as a two way valve used in tracer machinery controls.

This invention is not to be limited to the embodiment shown in the drawings and described in the description, which is given by way of example and not of limitation, but only in accordance with the scope of the appended claims.

What is claimed is:

1. An exercise treadmill tank for horses, said horses when at least partially submerged in the water in said tank, being likely to foul the water in the tank with fecal material, thereby presenting on emergence a physical appearance disagreeable to many owners of horses, and while exercising, also being likely to foul the mechanisms submerged in the water, and absent lubrication, to cause excessive wear on the belt as the consequence of driving the belt while the horse periodically steps on the belt, said treadmill tank comprising:

pool structure having a bottom, sidewalls and an open top, said bottom being adapted to support a treadmill, and said sidewalls rising to a height sufficient to contain water to a desired level; and a treadmill on said bottom comprising a driven imperforate endless belt wrapped around drive roller means so as to form a top run on which an animal is supported to be exercised, and which has a rigid support plate beneath said top run, said plate having a top side to support said top run, and a bottom side, perforations through said plate beneath said top run, and air supply means beneath said support plate positively discharging air to said bottom side of said plate, whereby air flows only positively through said perforations to said top side to form at least a partial separation of said belt from said support plate, said top run being disposed at an elevation below the intended water level during exercise, the partial separation of said belt and said support plate thereby including both water and air to reduce friction and wear on the belt, and said water and air flow positively separating said belt and said top side to flush the space between them, thereby removing fecal matter from said space between the, said sidewall having skimmer ports entering the pool structure near the said level, filter means, and recirculator means circulating water from said skimmer ports to said filter means, and thence to the pool; said air assisting in raising particulate material to the surface of the water in the pool and thence to said skimmer ports.

* * * * *